United States Patent
Nicoletti, III

(10) Patent No.: US 7,877,527 B2
(45) Date of Patent: Jan. 25, 2011

(54) CLUSTER PC

(75) Inventor: Leonard D. Nicoletti, III, Philadelphia, PA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1259 days.

(21) Appl. No.: 10/936,265

(22) Filed: Sep. 8, 2004

(65) Prior Publication Data

US 2006/0069806 A1    Mar. 30, 2006

(51) Int. Cl.
*G06F 3/00* (2006.01)
*G06F 5/00* (2006.01)

(52) U.S. Cl. .............................. 710/36; 710/37; 710/38

(58) Field of Classification Search .............. 710/36–38
See application file for complete search history.

(56) References Cited

U.S. PATENT DOCUMENTS

| 7,047,300 B1* | 5/2006 | Oehrke et al. ............... 709/226 |
| 2002/0158775 A1 | 10/2002 | Wallace ................. 340/870.07 |
| 2004/0109429 A1 | 6/2004 | Carter et al. ................ 370/338 |
| 2005/0216822 A1* | 9/2005 | Kyusojin et al. ......... 715/501.1 |
| 2006/0181406 A1* | 8/2006 | Petite et al. ................. 340/521 |

FOREIGN PATENT DOCUMENTS

| WO | WO 00/62664 A1 | 10/2000 |
| WO | WO 02/067122 A1 | 8/2002 |

OTHER PUBLICATIONS

Tanenbaum, Structured Computer Organization, 1984, Prentice Hall, 2nd edition p. 11.*

* cited by examiner

*Primary Examiner*—Alford W Kindred
*Assistant Examiner*—David E Martinez
(74) *Attorney, Agent, or Firm*—Mayer & Williams PC; Stuart H. Mayer, Esq.; Karin L. Williams, Esq.

(57) ABSTRACT

A computer design based on a platform of multiple central processing units (CPUs). When running multiple applications, each of the multiple CPUs performs all the processing for one of the individual applications. All of the multiple CPUs may operate below the physical layer of the OSI model. They may communicate with each other in a various manners, and they each communicate with a "gateway" CPU that is logically disposed above them on the physical level. The gateway CPU acts as a door or clearinghouse to and from the underground layer. The processing that occurs by the multiple CPUs on the underground layer allows a higher level of security, reliability, and speed compared to conventional single-CPU multitasking systems.

25 Claims, 3 Drawing Sheets

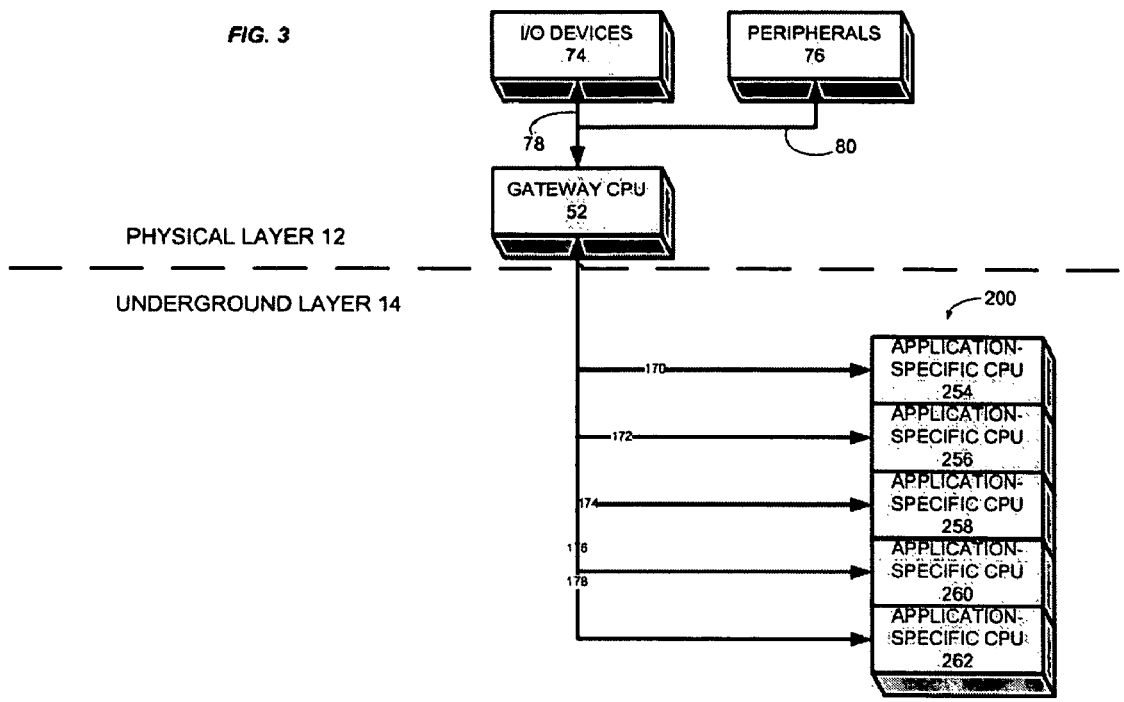
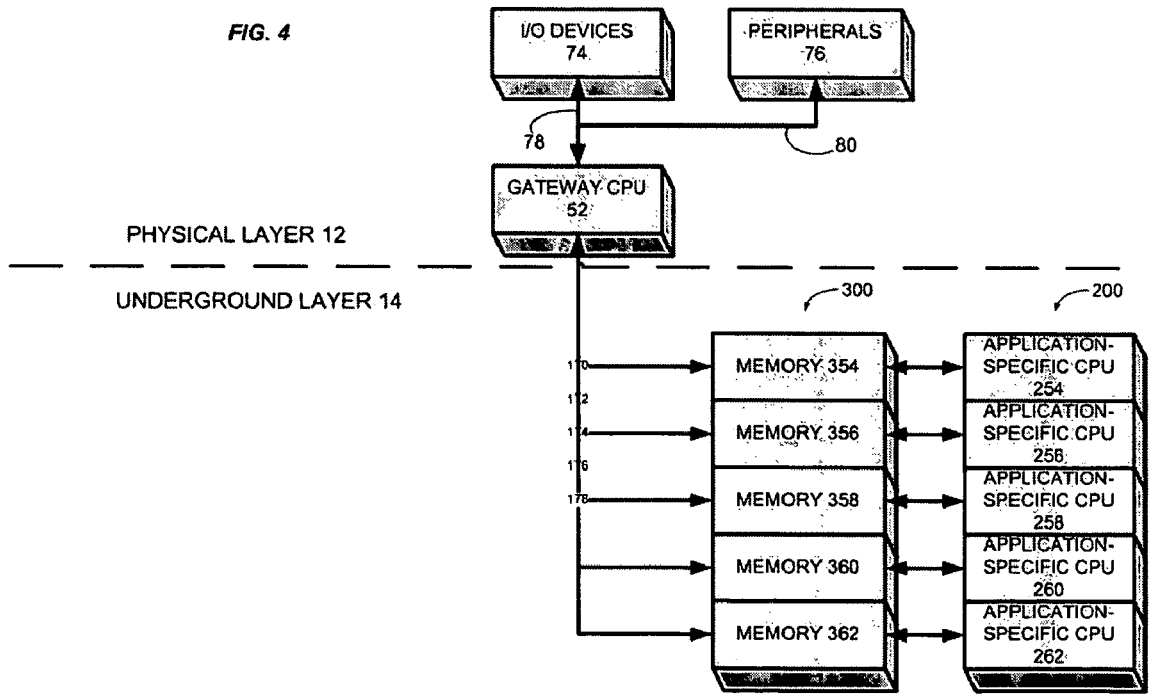

CLUSTER PC

BACKGROUND OF THE INVENTION

Current computers typically employ a single main microprocessor or central processing unit (CPU) to run applications. Multiple applications can be run simultaneously via multitasking, whereby the single CPU is employed to run multiple applications by switching from one application to the next so rapidly that it appears all of the applications are running at the same time. Two types exist: preemptive multitasking has the CPU apportioning amounts of time to each application; cooperative multitasking has each application using the CPU for as long as necessary.

In both cases, the CPU is not substantially devoted to any one application, causing delays in processing which become more noticeable to the user as the complexity of the applications, and the number of applications simultaneously run by the user, increases. In addition, the possibility of processing errors increases as the CPU is forced to handle more complex and numerous applications simultaneously.

SUMMARY OF THE INVENTION

In one aspect, the invention is directed towards a client-based computer design based on a platform of multiple central processing units (CPUs). When running multiple applications, each of the multiple CPUs performs the processing for each of the individual applications.

All of the multiple CPUs may operate below the physical layer of the OSI model. They may communicate with each other in a serial fashion, and they each communicate with a "gateway" CPU that is logically disposed above them on the physical level. The gateway CPU acts as a door or clearinghouse to and from the underground layer.

The processing that occurs by the multiple CPUs on the underground layer allows a higher level of security, reliability, and speed compared to conventional single-CPU multitasking systems.

BRIEF DESCRIPTION OF THE DRAWINGS

FIG. 3 shows a schematic depiction of an embodiment of the invention employing a vertically-stacked set of application-specific CPUs communicating with a gateway CPU via plural buses.

FIG. 4 shows a schematic depiction of an embodiment of the invention employing a vertically-stacked set of memories communicating with respective application-specific CPUs, the memories further communicating with a gateway CPU via plural buses.

DETAILED DESCRIPTION

Definitions

A "gateway CPU" refers to a central processing unit or microprocessor that is resident in the physical layer of a client-based computer system. It is the CPU that is responsible for communicating with various plural application-specific CPUs in the underground or sub-layer. The gateway CPU may be identified with the CPU in non-parallel-processing computers, except in part for its enhanced abilities to communicate with application-specific CPUs. In other words, in addition to the usual capabilities of accepting inputs from devices and providing outputs for devices, the gateway CPU can also receive inputs from application-specific CPUs and can further provide outputs to the same. To the extent the application-specific CPUs have inputs and outputs similar to or the same as devices, the gateway CPU can be a convention CPU running a conventional operating system. The gateway CPU functions in a typical fashion across IP networks, but acts more like a buffer to applications running on the underground level and a driver to the GUI, I/O, and memory subsystems.

An "application-specific CPU" is a CPU that is substantially devoted to processing one application in a computer system. It is a CPU that is resident in the underground layer. The design of the motherboard of the system may be such that enough application-specific CPUs may be accommodated for all the possible applications to be run on the PC. Moreover, the design of the motherboard of the system may be such that additional CPUs may be added on at a later time. It should be noted that the application-specific CPU is different from the known types of co-processors, such as math co-processors or graphics co-processors. The application-specific CPUs may further be designed and configured to run specific assigned applications. For example, one may be designed specifically for MS Word, another for MS Access, another for video-intensive game play, etc. In building an application-specific CPU, the hardware designer may consult the software designer for any particular requirements or standards desirable to provide the most efficient operation of the software.

The "physical" "layer" is the processing layer of the gateway CPU, and is capable of communicating in known fashion with I/O devices and peripherals. The physical layer may operate on typical PC or MAC operating systems. While embodiments of the current invention may apply to almost any type of computer system, they may be particularly well-applied to notebook computer systems, as computing power is typically the most costly and limited in these environments.

The "underground" or "sub-" "layer" is the processing layer of the application-specific CPUs. It may generally only be accessed via the gateway CPU, although application-specific CPUs may communicate with each other as well. The underground layer is generally unique to any one computer system.

Figure 1:
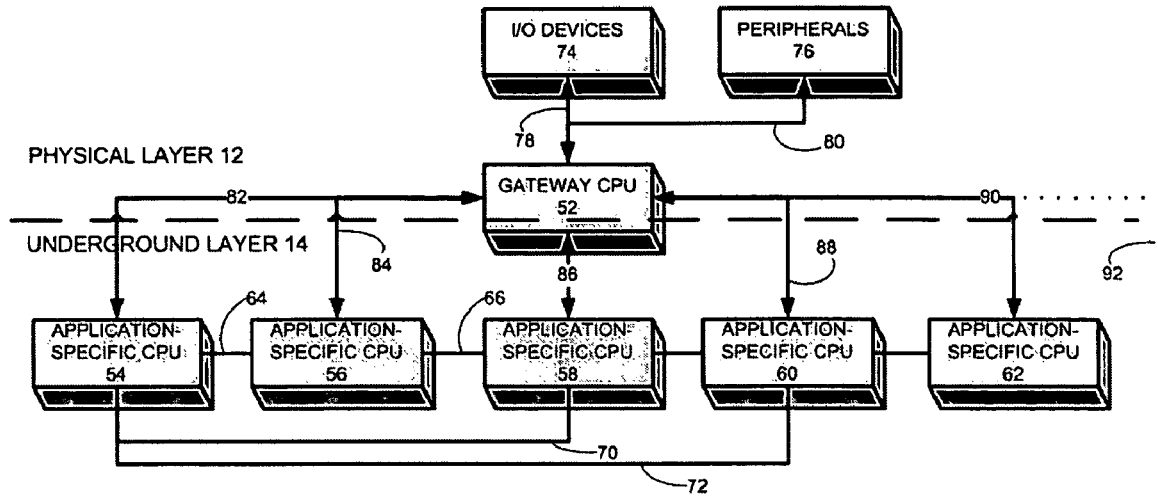
FIG. 1 shows a schematic depiction of an embodiment of the invention.

Referring to FIG. 1, which shows a schematic depiction of an embodiment of the invention, a physical layer 12 is shown that includes a gateway CPU 52. The gateway CPU 52 communicates with various plural application-specific CPUs 54-62 in an underground layer 14. The gateway CPU 52 also communicates with various I/O devices and peripherals, shown schematically and cumulatively as I/O DEVICES 74 and PERIPHERALS 76. The communication between the gateway CPU 52 and the I/O devices 74 or the peripherals 76 is via the I/O buses 78 or 80, respectively. Of course, a local bus may also be employed if warranted for especially fast data transfer rates.

In the underground layer 14, a plurality of application-specific CPUs 54-62 is shown. The application-specific CPUs 54, 56, 58, 60, and 62 connect to the gateway CPU 52 via buses 82, 84, 86, 88, and 90, respectively. In addition, a bus 92 is shown indicating the expandability of the system.

The application-specific CPUs 54-62 may also connect to each other via serial connections 64, 66, 70, 72, as well as numerous other connections (not shown) such as optical or RF. In general, each application-specific CPU 54-62 may connect to each other one, and may do so in a serial, parallel, or other fashion. Serial connections may be preferable due to differing bus or address widths between application-specific CPUs.

One reason such connections between the application-specific CPUs are desirable is that a data object may be shared between several applications in this way. For example, a table created in MS Excel may be desired to be present in an MS Word document as well. Either the table may be stored in memory or on a hard drive, and then accessed by the MS Word document, or the table may be transferred to the MS Word document via an application-specific CPU serial connection such as connections 64, 66, 70, 72. The communication scheme between the application-specific CPUs allows the system to be expanded as needed, allowing access to a sub network across multiple platforms if need be with added gate hardware. This aspect is discussed in more detail below.

In use, each application-specific CPU only accesses the gateway CPU when necessary. Furthermore, each application-specific CPU substantially runs only the application assigned to it, and may employ memory for such application as may be either assigned to it or apportioned to it out of a general memory sub-system. It is to be understood that each application-specific CPU may also include software, hardware, or firmware which enables the same to communicate with the rest of the system in an organized fashion; such administrative applications are in no way to be construed as contradicting the mandate of the application-specific CPU to run substantially only the application assigned to it.

Each application-specific CPU may access the video board either on its own or through the gateway CPU, according to the application, in order to update the video display when a change occurs in the state of an application-specific CPU that results in a change to the user interface or appearance of an application display. The same is true of access to various co-processors as may be needed or desired.

The gateway CPU thus is less responsible for running applications and more responsible for coordinating the running of applications by the application-specific CPUs. Its primary functions include buffering data between the application-specific CPUs and the gateway CPU as well as driving the GUI, I/O, peripherals, and memory subsystems.

The system may enjoy enhanced security. For example, software and viruses would have an additional layer to penetrate before reaching the application-specific CPUs. The conventional multitasking system uses its open design for security, whereas a design according to an embodiment of the current invention employs its processing below the physical layer as a physical hardware boundary, and is thus not entirely software-dependent for security.

Figure 2:
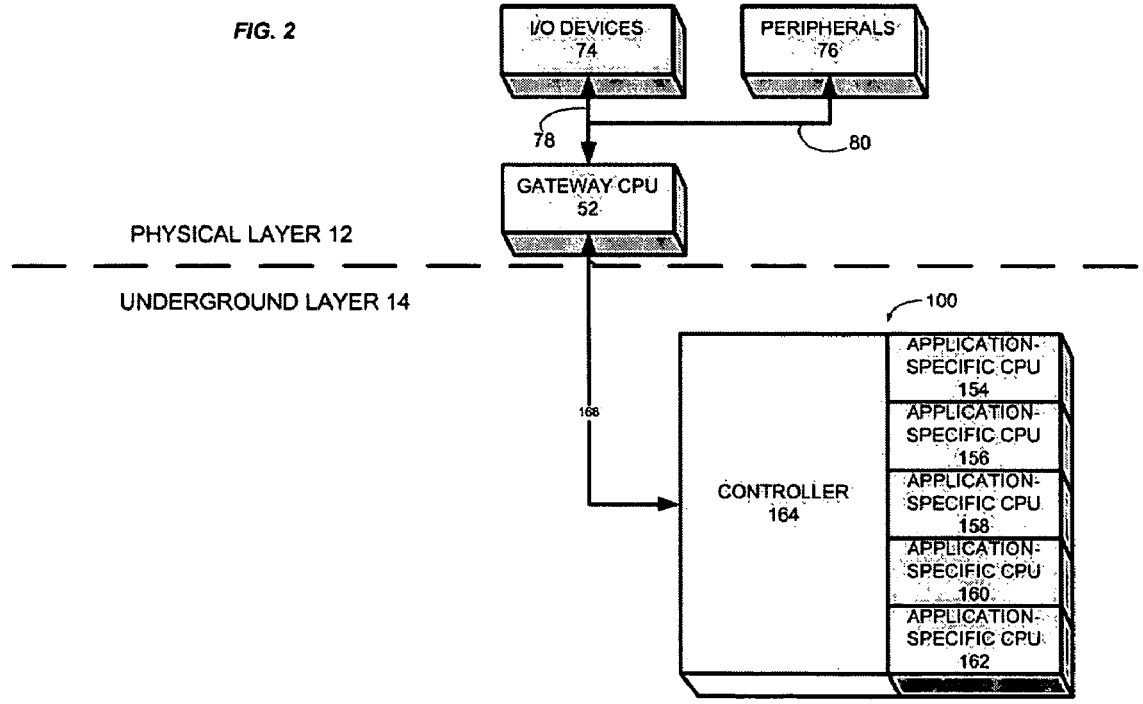
FIG. 2 shows a schematic depiction of an embodiment of the invention employing a vertically-stacked set of application-specific CPUs communicating with a gateway CPU via a controller.

In alternative embodiments, a vertical stack of CPUs can be designed into a single package 100 for the purpose of providing a convenient system for application-specific CPUs. For example, and referring to FIG. 2, a vertical stack of application-specific CPUs 154-162 is shown connected to a gateway CPU 52 via a controller 164. Controller 164 coordinates communications between the application-specific CPUs 154-162 and the controller 164. The controller 164 and its bus 166 may be of various varieties. The bus 166 may be similar to that of bus 82 in FIG. 1, in which case the controller 164 is required to coordinate which of the application-specific CPUs 154-162 is communicating with the bus 166 at any given time.

Alternatively, the controller 164 and its bus 166 may be of a type more functionally similar to FIG. 1, as shown in FIG. 3, in which each of the application-specific CPUs 254-262 in the stack 200 is communicating with the gateway CPU 52 independently via buses 170-178, respectively.

In another alternative embodiment, shown in FIG. 4, a dynamic 3D layered memory 300 may be created. In this way, writing to a memory address may store data simultaneously to multiple registers 354-362 for simultaneous reading from multiple CPUs 254-262 respectively. Of course, the memories may be physically different; they need not be arranged in a vertical stack. The same is true of the application-specific CPUs. All other reference numerals refer to the same or similar elements in the prior figures.

Figure 5:
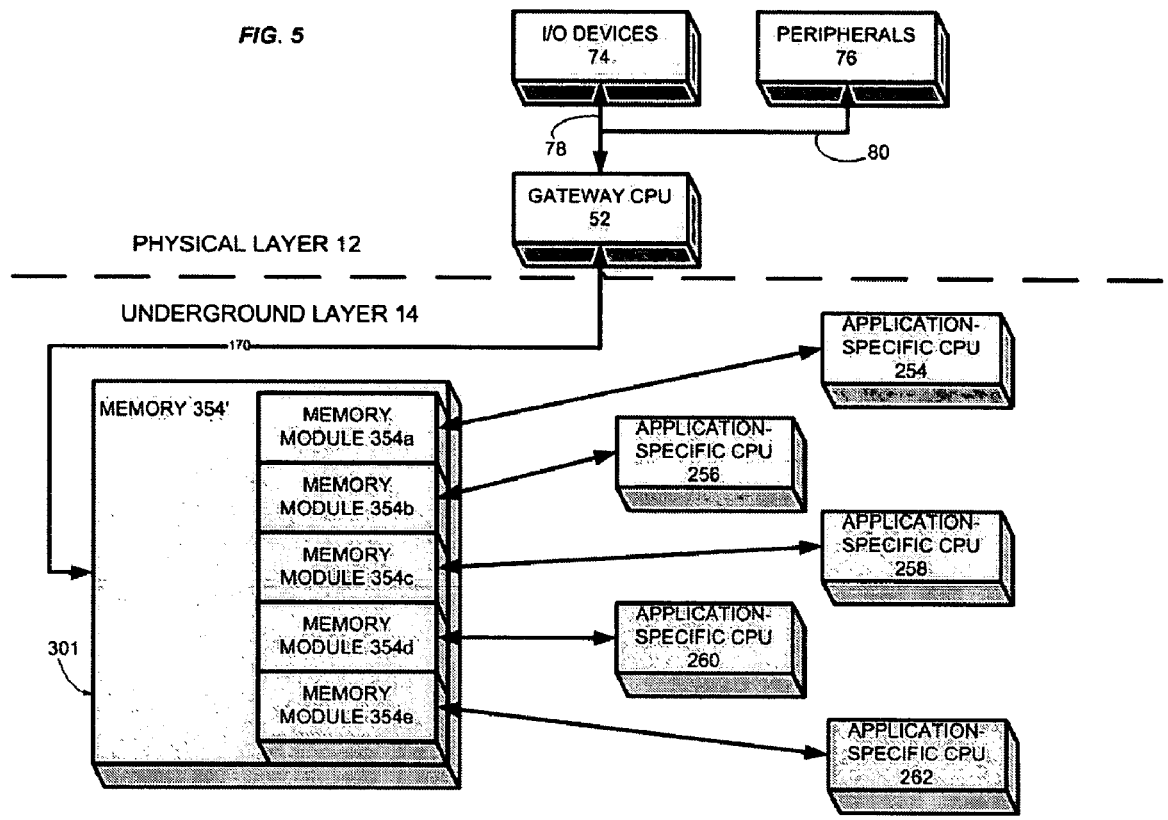
FIG. 5 shows a schematic depiction of an embodiment of the invention employing a single register memory with multiple memory modules, each of which has the same memory location with respect to the CPU.

In a related alternative embodiment, shown in FIG. 5, an embodiment in shown in which a single memory register, such as register 354 from FIG. 4, employs multiple memory modules. In particular, memory register 354' has a plurality of memory modules 354a-354e. When a byte or word is written to memory register 354', the same is written to each of the plurality of memory modules 354a-354e. Each module has the same memory location with respect to the CPU. Each memory module may have the same word length, access rate, and data within it. All other reference numerals refer to the same or similar elements in the prior figures.

Of course, it is noted that the same need not be physically stacked. They may simply be "stacked" within the architecture of the system. The grouping may be physically present in hardware, or may be created by software, or by a combination of both. One advantage to using hardware, and a physically-stacked design, is that critical time may be saved over performing the same functions entirely in software.

Depending on the number of applications that need access to register 354', there may be that number of memory modules created and accessible, to be accessed by the applications simultaneously. One application of this would be for high-definition streaming.

While five modules 354a-354e are shown, any number of modules may be implemented.

A naming convention for such a system may be, e.g., 65.5 k×8×5, where 65.5 k represent the address locations, 8 the number of address lines, and 5 the number of memory modules. Corresponding to this, vertically-stacked busses, control lines, etc., may also be employed, running to and from the memory modules.

As noted above, the communication scheme between the application-specific CPUs allows the system to be expanded as needed, allowing access to a sub network across multiple platforms if need be with added gate hardware.

The invention has been described with respect to certain embodiments. However, the scope of what is claimed as the invention is to be construed only by the appended claims.

The invention claimed is:

1. A computer, comprising:
a gateway CPU that communicates with at least one of: I/O devices and peripherals, said gateway CPU residing in a first processing layer of the computer that includes a physical interface between the computer and a transmission medium;
a plurality of application-specific CPUs communicating with the gateway CPU, said plurality of application-specific CPUs residing in a second processing layer of the computer different from the first processing layer, and each application-specific CPU dedicated to running only one main application but capable of running secondary administrative applications, each of the application-specific CPUs accessing the gateway CPU, or the gateway CPU accessing the application-specific CPUs, when necessary to access the at least one of: the I/O devices and the peripherals, such that primary functions of the gateway CPU include acting as a buffer or clearinghouse for data to and from the application-specific CPUs and does not perform application-specific processing itself;

and further comprising at least one connection between one of the application-specific CPUs and another of the application-specific CPUs such that the data can be directly transferred from one to another.

2. The computer of claim 1, wherein the connection is a serial or parallel connection.

3. The computer of claim 1, wherein the application-specific CPUs are designed and configured to run specific assigned applications.

4. The computer of claim 3, wherein at least one of the application-specific CPUs are designed and configured to run an application selected from the group consisting of: word-processing applications, spreadsheet applications, database applications, desktop publishing applications, and internet browsing applications.

5. The computer of claim 1, further comprising multiple connections between respective ones of the application-specific CPUs.

6. The computer of claim 1, wherein each of the application-specific CPUs accesses the gateway CPU according to a predetermined schedule.

7. The computer of claim 1, wherein each of the application-specific CPUs accesses the gateway CPU according to a queue.

8. The computer of claim 1, wherein each of the application-specific CPUs accesses the gateway CPU according to a priority scheme.

9. A method for computing, comprising:

providing a gateway CPU that communicates with at least one of: I/O devices and peripherals, said gateway CPU residing in a first processing layer of the computer that includes a physical interface between the computer and a transmission medium;

providing a plurality of application-specific CPUs communicating with the gateway CPU, said plurality of application-specific CPUs residing in a second processing layer of the computer different from the first processing layer;

each application-specific CPU dedicated to running at most one main application-but capable or running secondary administrative applications;

communicating data between one of the application-specific CPUs and another directly without passing the data through the gateway CPU;

wherein the application-specific CPUs accesses the gateway CPU, or the gateway CPU accessing the application-specific CPUs, when necessary to access the at least one of: I/O devices and peripherals, such that primary functions of the gateway CPU include acting as a buffer or clearinghouse for data to and from the application-specific CPUs and does not perform application-specific processing itself.

10. The method of claim 9, wherein the communicating data step includes communicating data via a serial or parallel connection.

11. The method of claim 9, further comprising designing and configuring the application-specific CPUs to run specific assigned applications.

12. The method of claim 11, wherein at least one of the application-specific CPUs are designed and configured to run an application selected from the group consisting of: word-processing applications, spreadsheet applications, database applications, desktop publishing applications, and internet browsing applications.

13. The method of claim 9, wherein the communicating data step further comprises communicating multiple data between multiple application-specific CPUs via multiple connections between respective ones of the application-specific CPUs.

14. The method of claim 9, further comprising accessing the gateway CPU by each of the application-specific CPUs according to a predetermined schedule.

15. The method of claim 9, further comprising accessing the gateway CPU by each of the application-specific CPUs according to a queue.

16. The method of claim 9, further comprising accessing the gateway CPU by each of the application-specific CPUs according to a priority scheme.

17. A method for computing, comprising:

providing a gateway CPU that communicates with at least one of: I/O devices and peripherals, said gateway CPU residing in a first processing layer of the computer that includes a physical interface between the computer and a transmission medium;

providing a plurality of application-specific CPUs communicating with the gateway CPU, said plurality of application-specific CPUs residing in a second processing layer of the computer different from the first processing layer, and running at most one main application on each application-specific CPU, but capable of running secondary administrative applications;

wherein the application-specific CPUs accesses the gateway CPU, or the gateway CPU accessing the application-specific CPUs, when necessary to access the at least one of: I/O devices and peripherals, such that primary functions of the gateway CPU include acting as a buffer or clearinghouse for data to and from the application-specific CPUs and does not perform application-specific processing itself.

18. The method of claim 17, further comprising providing a memory register including plural memory modules, each module in the plurality being provided the same data as written to the memory register, wherein each of the plurality of application-specific CPUs may access a separate module for retrieval of data.

19. The method of claim 18, wherein the providing a memory register includes providing the memory register in hardware.

20. The method of claim 18, wherein the providing a memory register includes providing the memory register in software.

21. The method of claim 18, wherein the providing a memory register includes providing the memory register in a combination of hardware and software.

22. A method for computing, comprising:

providing a gateway CPU that communicates with at least one of: I/O devices and peripherals, said gateway CPU residing in a first processing layer of the computer that includes a physical interface between the computer and a transmission medium;

providing a plurality of application-specific CPUs communicating with the gateway CPU, said plurality of application-specific CPUs residing in a second processing layer of the computer different from the first processing layer;

such that primary functions of the gateway CPU include acting as a buffer or clearinghouse for data to and from the application-specific CPUs and does not perform application-specific processing itself, and further comprising at least one memory register for storage of the data for the application-specific CPUs, the memory register including plural memory modules, each module in the plurality being provided the same data as written to the memory register, wherein each of the plurality of application-specific CPUs may access a separate module for retrieval of the data.

23. The method of claim 22, wherein the memory register is implemented in hardware.

24. The method of claim 22, wherein the memory register is implemented in software.

25. The method of claim 22, wherein the memory register is implemented in a combination of hardware and software.

* * * * *